US005162126A

United States Patent [19]

Thörner et al.

[11] Patent Number: 5,162,126

[45] Date of Patent: Nov. 10, 1992

[54] EDIBLE, REINFORCED PACKAGE FOR FOODSTUFF

[75] Inventors: Hans-Heinz Thörner; Rolf Kühn, both of Oberhausen, Fed. Rep. of Germany

[73] Assignee: Wilh. Schmitz-Scholl, Mulheim, Fed. Rep. of Germany

[21] Appl. No.: 541,124

[22] Filed: Jun. 20, 1990

[30] Foreign Application Priority Data

Jun. 30, 1989 [DE] Fed. Rep. of Germany ....... 3921548

[51] Int. Cl.$^5$ .............................................. A21D 13/00

[52] U.S. Cl. ...................................... 426/138; 426/89; 426/94; 426/391; 426/496

[58] Field of Search ................. 426/138, 139, 391, 89, 426/90, 91, 92, 93, 94, 496

[56] References Cited

U.S. PATENT DOCUMENTS 2,089,674 8/1937 Turnbull ............................ 426/139
2,694,012 11/1954 Washburn ........................... 426/139
3,922,398 11/1975 Bridgeford et al. ................ 426/138
4,399,157 8/1983 Caporaso ............................ 426/138
4,431,675 2/1984 Schroeder et al. ................... 426/69
4,472,440 9/1984 Bank ................................... 426/138
4,713,135 12/1987 Bridgeford ........................... 426/138
4,774,095 9/1988 Kleinschmidt ........................ 426/94
4,873,099 10/1989 Ruiz ..................................... 426/138
4,879,125 11/1989 Pak ...................................... 426/138
4,931,301 6/1990 Giuseppe ............................ 426/391

FOREIGN PATENT DOCUMENTS 3320576 12/1983 Fed. Rep. of Germany ...... 426/138
3036768 2/1988 Japan .................................... 426/89

*Primary Examiner*—Steven Weinstein
*Assistant Examiner*—Jean L. Aberle
*Attorney, Agent, or Firm*—Herbert Dubno; Andrew Wilford

[57] ABSTRACT

A package for a foodstuff has an outer container and an inner container inside the outer container and formed with at least one recess adapted to hold the foodstuff. The inner container is formed at least in regions where it contacts the foodstuff of an edible material. The inner container is provided with reinforcement also made of an edible material such as a mesh of natural fibers. In addition the inner container is formed of a pressed, baked, and/or dry material.

3 Claims, 1 Drawing Sheet

FIG. 1
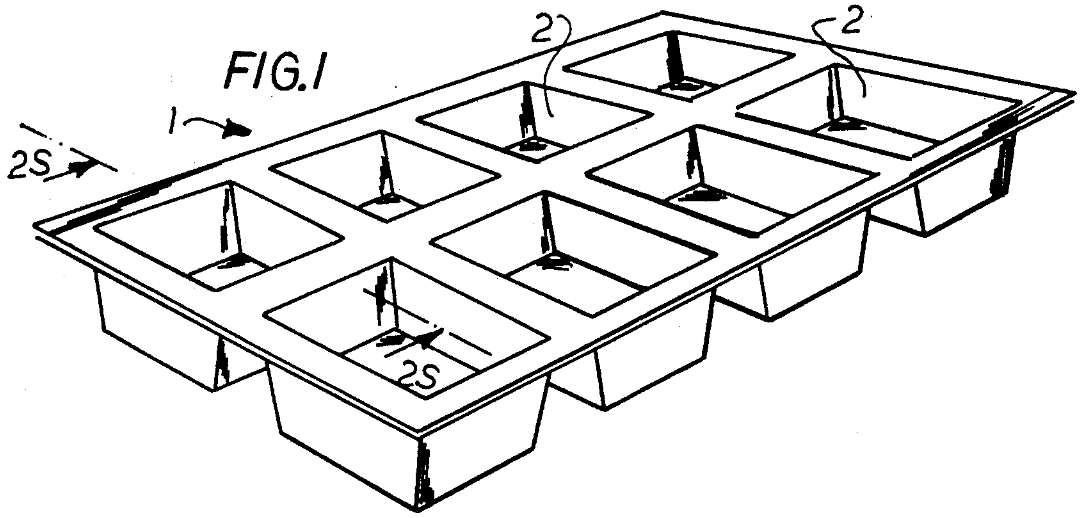
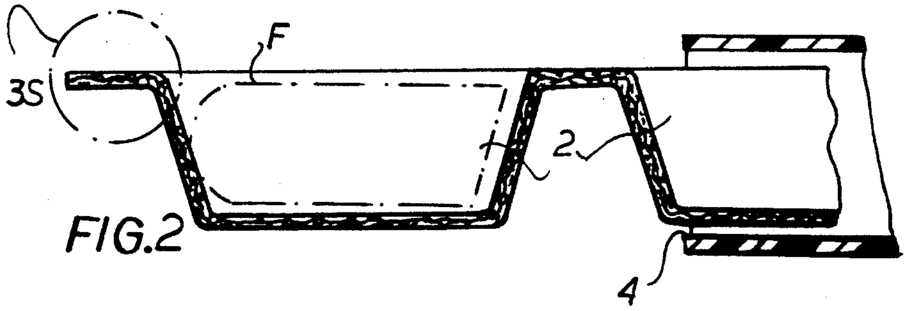
FIG. 2
FIG. 3
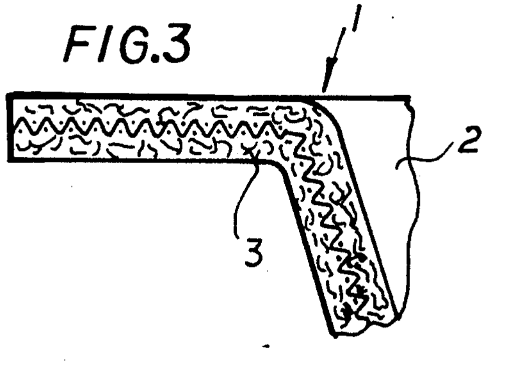
FIG. 4
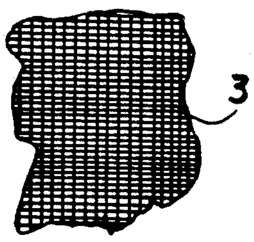

EDIBLE, REINFORCED PACKAGE FOR FOODSTUFF

FIELD OF THE INVENTION

The present invention relates to a package. More particularly this invention concerns a package used for containing an edible foodstuff.

BACKGROUND OF THE INVENTION

A standard package for a foodstuff, for instance chocolate candies, has an outer container formed of a box or bag made of a suitable cardboard, paper, plastic or metal foil, or the like, and an inner container formed with pockets or recesses receiving the individual portions of the foodstuff.

As a rule the inner container is made of another standard packaging material such as plastic. Typically a stiff plastic insert is used that is molded by deep drawing to have the food-holding pockets. Such a package is standard for marketing sweets such as chocolates, small pastries, and other forms of candy.

Unfortunately the inner package creates a substantial disposal and pollution problem. It does not rot under normal circumstances.

Another problem with the known inner container is that it is possible for components such as solvents or plasticisers to diffuse out of it into the foodstuff, leaving it with an unpleasant plastic taste.

OBJECTS OF THE INVENTION

It is therefore an object of the present invention to provide an improved foodstuff package.

Another object is the provision of such an improved foodstuff package which overcomes the above-given disadvantages, that is whose inner container does not contaminate the foodstuff being contained and also does not present an environmental hazard.

SUMMARY OF THE INVENTION

A package for a foodstuff according to the invention has an outer container and an inner container inside the outer container and formed with at least one recess adapted to hold the foodstuff. The inner container is formed at least in regions where it contacts the foodstuff of an edible material.

Thus with this package the material of the inner container cannot contaminate the foodstuff since it is itself made of a foodstuff. Furthermore the material of the inner container is wholly biodegradable, posing no significant pollution or disposal problem.

According to this invention the inner container is provided with reinforcement also made of an edible material. In addition the inner container is formed of a pressed, baked, and/or dry material. Such a baked-good inner container can be made of flour with additives such as wafer-like pressed meat, spun sugar. It can also be made of a crystal conglomerate and the reinforcement can be added for decorative purposes also.

In fact the inner container can be made so that it is intended to be eaten also. In this case natural fibers are used as reinforcement. Such an inner package cannot possibly contaminate the foodstuff it is holding.

DESCRIPTION OF THE DRAWING

The above and other objects, features, and advantages will become more readily apparent from the following, reference being made to the accompanying drawing in which:

FIG. 1 is a perspective view of an inner container according to this invention;

FIG. 2 is a section taken along line 2S—2S of FIG. 1 with part of the outer container shown also;

FIG. 3 is a large-scale view of the detail indicated at 3S, in FIG. 2; and

FIG. 4 is a detail top view of the reinforcement of the container.

SPECIFIC DESCRIPTION

As seen in FIGS. 1, 2, and 3 a package for a foodstuff indicated in dot-dash lines at F basically comprises an outer container shown partially at 4 in FIG. 2 and comprised of a box or bag and an inner container 1 formed with a plurality of pockets 2 each receiving a respective piece of the foodstuff F.

According to the invention the inner container 2 is formed of an edible material in which is imbedded a fiber-fleece reinforcement web or mesh 3. The material can be a baked and pressed mixture of flour, egg white, and sugar and the reinforcement mesh 3 can be formed of natural fibers imbedded in the pressed mixture.

Thus the inner container 1 can be disposed of with no worry about creating a long-term hazard to the environment, as it will biodegrade rapidly. Alternately it can even be eaten by the consumer himself or herself, or used as animal food. There will be no solvents or the like in the inner container 1 that could contaminate or impart an unpleasant taste to the contained foodstuff F.

We claim:

1. A package for a foodstuff, the package comprising: an outer container;
   an inner container inside the outer container and formed with at least one recess adapted to hold the foodstuff, the improvement wherein the inner container is formed of an edible material; and
   a reinforcement mesh formed of natural fibers imbedded in the inner container.

2. The improved foodstuff package defined in claim 1 wherein the inner container is formed of a pressed baked material.

3. The improved foodstuff package defined in claim 1 wherein the reinforcement is formed of edible natural fibers.

* * * * *